Patented Oct. 4, 1932

1,880,924

UNITED STATES PATENT OFFICE

OTTO EISENHUT, OF HEIDELBERG, GERMANY, ASSIGNOR TO I. G. FARBENINDUSTRIE AKTIENGESELLSCHAFT, OF FRANKFORT-ON-THE-MAIN, GERMANY

PRODUCTION OF CARBON BLACK, ACETYLENE, AND HYDROGEN

No Drawing. Application filed January 10, 1930, Serial No. 420,006, and in Germany March 9, 1929.

This invention relates to improvements in the production of carbon black, acetylene and hydrogen.

In the treatment of gas mixtures containing hydrocarbons such as natural gas, in the electric arc, for which temperatures of from about 1000° to 1500° C. are employed, hydrocarbons are obtained in addition to carbon black and hydrogen, and these hydrocarbons consist mainly of ethylene and contain no acetylene or only negligible amounts thereof.

I have now found that the yield of acetylene in the treatment of gases consisting of or containing methane, such as natural gas, is considerably increased by working at temperatures of about 2500° C. or more and at any pressure and under such conditions that the ratio of the amount of gas measured in cubic meters, which is passed hourly through the electric arc to the power of the arc measured in kilowatts lies below about 0.6. Apart from the good yields of acetylene this manner of working has the advantage that a carbon black having excellent properties is obtained, which for example as a filler for rubber or for the preparation of vulcanization products from plastic and elastic polymerization products of diolefines, such as butadiene, isoprene and dimethyl-butadiene is equal to and in some cases superior to the best kinds of American gas black. It may also be usefully employed for coloring purposes for example for the preparation of india ink or printer's ink, by reason of its very deep color and good covering properties.

The following example will further illustrate the nature of this invention but the invention is not restricted thereto.

Example 53 cubic meters of a gas mixture consisting of methane, hydrogen and nitrogen and having a content of about 87 per cent of methane are passed in the course of an hour through an electric arc having a power of 100 kilowatts at a temperature of 2500° C.; the ratio of the amount of gas to the power of the electric arc is therefore 0.53. The gas mixture leaving the electric arc contains from 9 to 10 per cent of acetylene. The carbon black which is formed simultaneously in good yields is eminently suitable as a filler for rubber and the plastic and elastic polymerization products of diolefines. For example a rubber may be prepared therewith which has a tensile strength of from 294 to 300 kilograms per square centimeter, an extension of from 470 to 560 per cent and a good elasticity.

Gas mixtures having a smaller content of methane, as for example those containing from 40 to 45 per cent of methane may be employed with similar results.

What I claim is:—

1. A process for the production of carbon black, acetylene and hydrogen, which comprises passing a gas comprising methane through an electric arc at a temperature of at least 2500° C. under such conditions that the ratio of the amount of gas measured in cubic meters, which is passed hourly through the electric arc to the power of the arc measured in kilowatts lies below 0.6.

2. A process for the production of carbon black, acetylene and hydrogen, which comprises passing a mixture substantially consisting of methane, hydrogen and nitrogen through an electric arc having a power of about 100 kilowatts at a temperature of at least 2500° C. under such conditions that the ratio of the amount of gas measured in cubic meters, which is passed hourly through the electric arc to the power of the arc measured in kilowatts lies below 0.6.

3. A process for the production of carbon black, acetylene and hydrogen, which comprises passing a gas containing methane as a main constituent through an electric arc at a temperature of at least 2500° C. under such conditions that the ratio of the amount of gas measured in cubic meters, which is passed hourly through the electric arc to the power of the arc measured in kilowatts lies below 0.6.

In testimony whereof I have hereunto set my hand.

OTTO EISENHUT.